United States Patent [19]

Podell

[11] 4,409,528

[45] Oct. 11, 1983

[54] MOTOR SPEED CONTROL CIRCUIT PROVIDING ARMATURE CURRENT SENSING AND FEEDBACK ACTION FOR EACH HALF CYCLE AND CONTROL CIRCUIT REDUCING ENERGY CONSUMPTION OF INDUCTION MOTORS WHEN RUNNING UNDER NO LOAD AND LIGHT LOADING

[75] Inventor: Allen F. Podell, Palo Alto, Calif.

[73] Assignee: Cuisinarts, Inc., Greenwich, Conn.

[21] Appl. No.: 159,136

[22] Filed: Jun. 13, 1980

[51] Int. Cl.$^3$ ............................................. H02P 5/16
[52] U.S. Cl. ................................ 318/345 D; 318/729;
318/345 H; 318/510
[58] Field of Search .............. 318/729, 345 D, 345 H, 318/510

[56] References Cited

U.S. PATENT DOCUMENTS

| | | | |
|---|---|---|---|
| 2,648,808 | 8/1953 | Tiede | 318/510 |
| 3,466,529 | 9/1969 | Grafham | 318/345 H |
| 3,619,656 | 11/1971 | Domke | 307/252 T |
| 3,857,676 | 12/1974 | Hetland | 318/345 D |
| 4,181,876 | 1/1980 | Kato et al. | 318/345 H |

FOREIGN PATENT DOCUMENTS 365605 1/1932 United Kingdom ................ 318/729

OTHER PUBLICATIONS

J. A. Kuecken, *Solid State Motor Controls,* Tab Books, Blue Summit, Pa., 1978, pp. 72-78.

*Primary Examiner*—David Smith, Jr.

*Attorney, Agent, or Firm*—Parmelee, Bollinger & Bramblett

[57] ABSTRACT

A motor speed control circuit in which a source of alternating current (AC), a universal-type motor, a triac and a large capacitor are connected in series, with the armature current flowing through the large capacitor and with the control providing armature-current sensing and feedback action for each half cycle of motor operation for stabilizing motor speed at any speed setting in spite of changes in the torque load being imposed on the motor. A triggering circuit for the triac includes a diac connected on one side to the control electrode of the triac and on the other side to an RC network across the portion of the series circuit containing the large capacitor and the triac. The RC network includes a variable resistor for adjusting the speed of the motor by setting the phase of the signal to the triggering diac. Power is supplied to the motor during both positive and negative half cycles of the AC supply voltage. In the operation of the circuit embodying this invention, as the torque load imposed on the motor is increased for any given speed setting, the power supplied thereto is also increased to maintain the motor speed constant at that given setting over a wide operating range. This advantageous feedback action utilizes changes in the charging voltage across the large capacitor for changing the firing angle of the triac, thereby immediately changing the power being supplied to the motor and accordingly maintaining the speed constant under varying load conditions as they occur. Feedback occurs from the large capacitor during each and every half cycle for stabilizing the motor speed under variable conditions of loading for any particular setting of the motor speed.

12 Claims, 5 Drawing Figures

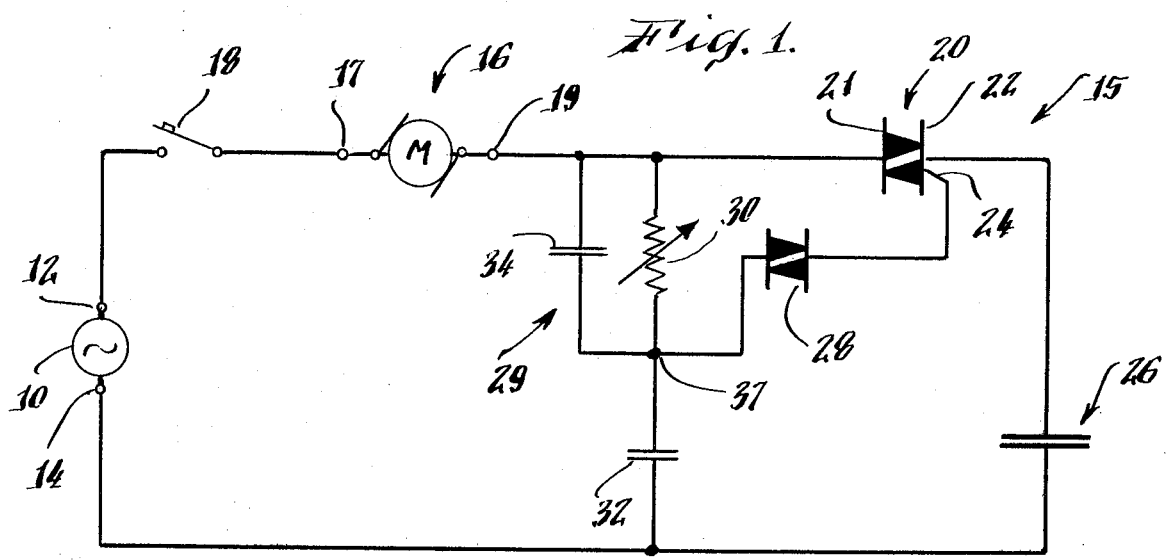
Fig. 1.
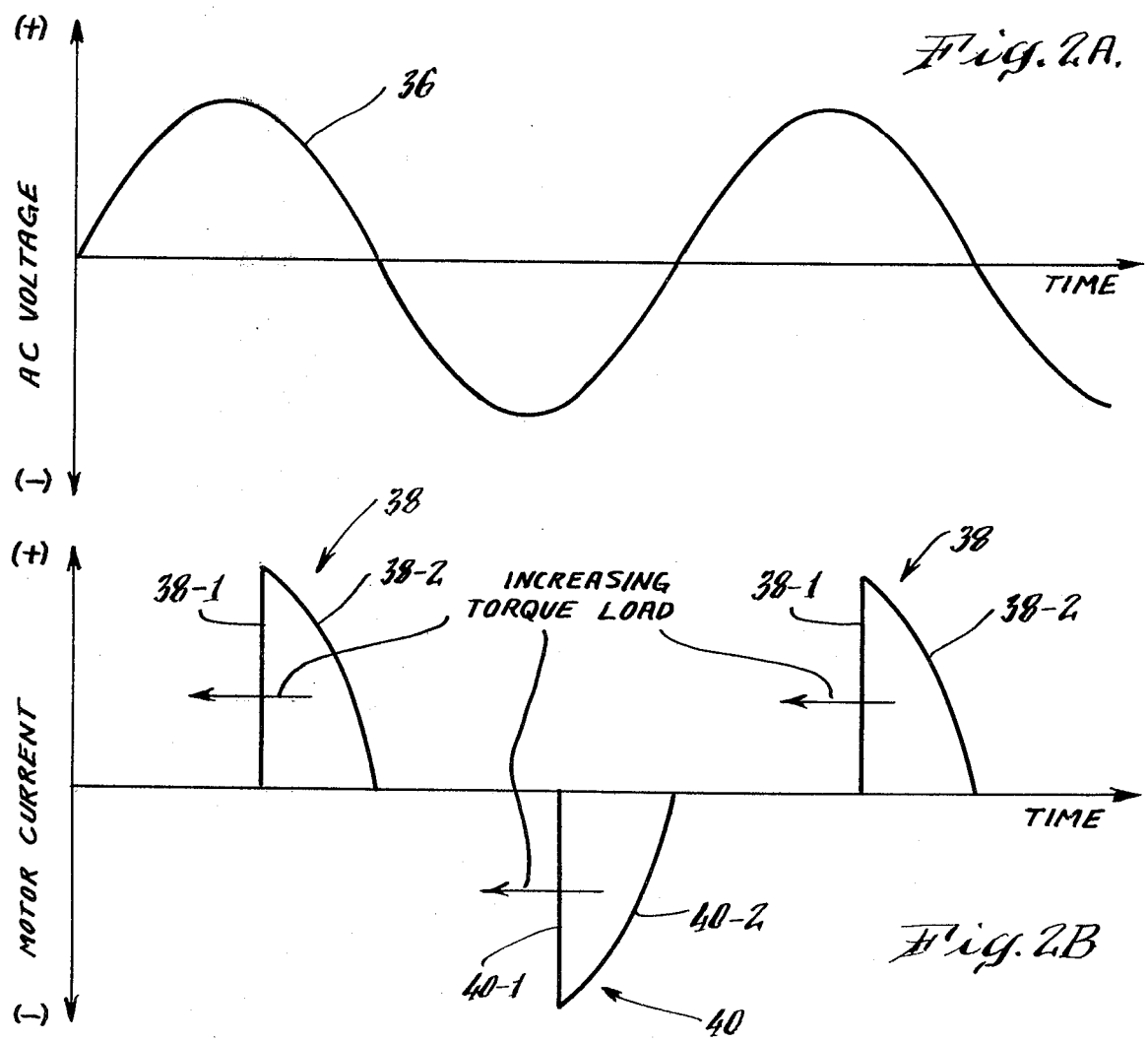
Fig. 2A.
Fig. 2B

MOTOR SPEED CONTROL CIRCUIT PROVIDING ARMATURE CURRENT SENSING AND FEEDBACK ACTION FOR EACH HALF CYCLE AND CONTROL CIRCUIT REDUCING ENERGY CONSUMPTION OF INDUCTION MOTORS WHEN RUNNING UNDER NO LOAD AND LIGHT LOADING

BACKGROUND OF THE INVENTION

This invention relates to a motor speed control circuit and a control circuit for reducing the energy consumption of induction motors running under no load or light loading conditions, and more particularly to such control circuits utilizing a triac whose conduction angle is varied as a function of the charge appearing during each half cycle on a large capacitor in series with the motor, said charge therefore depending on the torque load being applied to the motor which is being controlled.

The characteristics of triacs, which in effect are controlled bi-directional current-conducting semiconductor, makes such devices particularly suitable for controlling power supply circuits which operate on full-wave alternating current sources. Triacs have a control electrode or gate which has a triggering circuit such as a diac coupled thereto for controlling the firing and direction of current flow through the triac.

Although triacs are suitable for motor speed control, the prior art circuits in which triacs have functioned have been complex and somewhat difficult to control over wide ranges of operating speeds. The prior art motor speed control circuits exhibit serious shortcomings in those applications where it is desirable to maintain a set speed under variable load conditions. For example, consider a hand-held electric drill. When the drill is pressed into a workpiece, the motor is subjected to an increased torque load, and when the pressure on the drill is decreased, the motor experiences a decrease in torque load. Accordingly, it is common experience today that the motor is a commercially available prior art hand-held electric drill will slow down for a given trigger setting when the torque load is increased, and vice-versa. Of course, the speed of such a drill may be increased by manually increasing the trigger setting, but this change in trigger setting may result in excessive drill speed for the particular drilling job as soon as the drill pressure is reduced. Moreover, it is a bother and a distraction to the user to keep changing the trigger setting in an effort to make the motor speed behave as desired under changing drilling load conditions. Furthermore, frequent changes in pressure on the trigger distract the user from holding the drill handle steady for drilling a neat round hole at the desired angle of entry into the workpiece.

Insofar as I am aware, the concept of reducing the energy consumption of induction motors by automatically decreasing the effective voltage being applied to the motor when running no load or light loading conditions is entirely novel.

SUMMARY

Accordingly, it is an object of the present invention to provide a new and novel motor speed control circuit which is simple, reliable and inexpensive.

A further object of this invention is to provide a new and improved motor speed control circuit for supplying changing amounts of power to a motor operating under variable load conditions for holding the motor at a constant speed for a given speed control setting in spite of the fact that the motor is being subjected to variable load conditions.

A further object of this invention is to provide a new and novel motor speed control circuit in which the motor action is stabilized by feedback occurring during both negative and positive half cycles of the AC supply line voltage for varying the amount of power being supplied to the motor for compensating for variations in torque loading at any given speed setting.

An object of this invention is to reduce the energy consumption of induction motors when running under no load and light loading conditions and also to improve the power factor of the induction motor under such conditions.

In carrying out this invention in the illustrative embodiments thereof, a triac motor-control circuit is provided in which the triac is connected in series with an AC source, a universal-type or induction motor and a large capacitor such that the armature current or induction-motor current flows through this large capacitor and the resultant charging voltage occurring on this capacitor during each half cycle serves as a measure of torque load on the motor.

Among the advantages provided by a motor speed control circuit embodying the present invention are those resulting from the fact that electrical power is supplied to the motor during both positive and negative half cycles of the AC supply voltage. There is a very desirable feedback action occurring during each half cycle for maintaining the speed of the motor essentially constant in spite of changes in load being imposed on the motor. This feedback action utilizes changes in the charging voltage occurring across a large capacitor which is in series with the motor, thereby immediately altering the amount of power being supplied to the motor whenever a change in this charging voltage has occurred as a result of a change in torque load.

Among the advantages provided by the energy conserving, induction-motor control circuit embodying the present invention are those resulting from the fact that the effective voltage being applied across the induction motor is considerably reduced when the motor is running under no load and light loading conditions. Consequently, the reactive component of the motor current is considerably reduced, thereby providing a dramatic reduction in the $I^2R$ losses in the induction motor. Furthermore, the reduction is the reactive component of the induction-motor current produced by this control greatly improves the power factor when the induction motor is running under no load and light loading conditions.

The large capacitor in series with the motor also has the advantage of tending to bring the power factor of the overall circuit more nearly to unity than is the case when the motor by itself is operating at the same torque load and speed.

In one illustrative embodiment of the motor speed control circuit as described, an AC source, a universal-type motor, a triac and a large capacitor are connected in series. Thus, the armature current flows through this capacitor during each half cycle, and the voltage appearing across this capacitor serves for sensing the magnitude of the armature current during each half cycle, being utilized for providing feedback action for maintaining the motor speed essentially constant in spite of changes in the imposed load for any given motor speed setting over a wide range of operating conditions. A triggering circuit for the triac includes a diac connected on one side to the control electrode of the triac and on the other side to an RC network connected across the portion of the series circuit containing the triac and the large capacitor. The RC network includes a variable resistor for adjusting the speed of the motor by setting the phase angle of the signal being fed to the triggering diac.

BRIEF DESCRIPTION OF THE DRAWINGS

The invention, together with further objects, advantages and aspects thereof, will be more fully understood from the following description considered in connection with the accompanying drawings.

FIG. 1 is a schematic circuit diagram of an illustrative embodiment of the present invention in a new and novel motor speed control circuit in which armature current sensing and feedback action are provided for each and every half cycle of the AC supply line voltage.

FIGS. 2A and 2B show curves of voltage vs. time to illustrate the control action provided for a motor in the circuit shown in FIG. 1.

DESCRIPTION OF THE PREFERRED EMBODIMENTS

Figure 3:
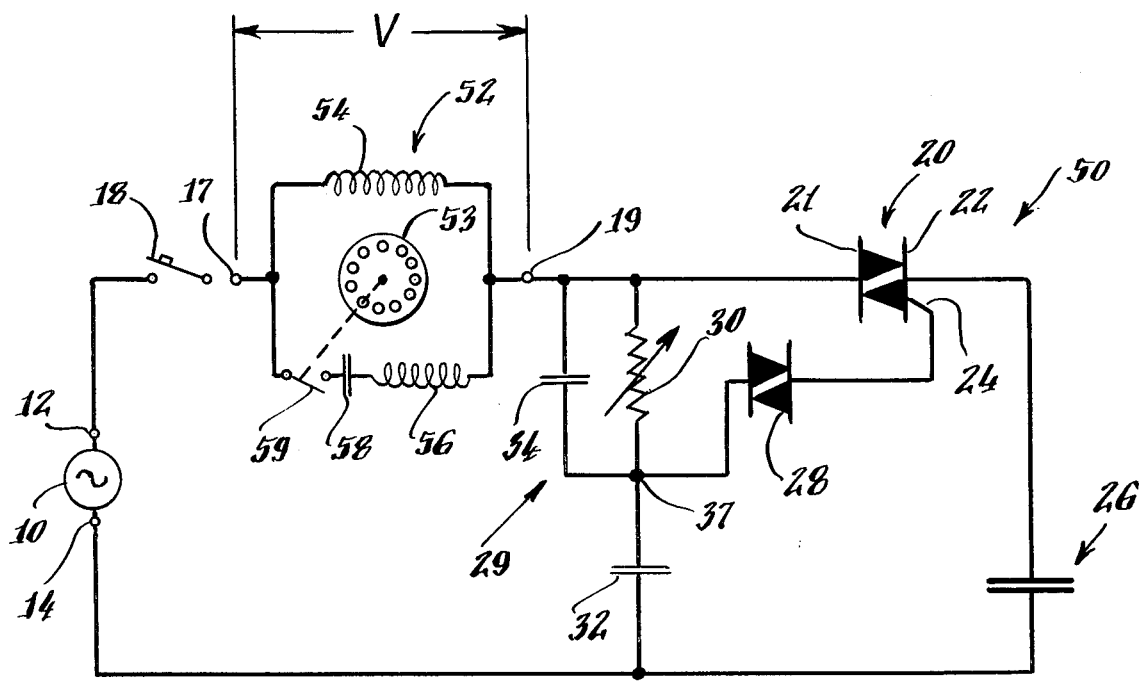
FIG. 3 shows the energy-saving induction-motor control of the present invention.

Referring now to FIG. 1, an alternating current source 10 is applied to terminals 12 and 14 of a motor speed control circuit, referred to generally by the reference character 15. A motor 16 is of the "universal" type. In other words, this motor 16 has an armature with a commutator and a field winding. The motor has one of its terminals 17 connected through an on-off switch 18 directly to the AC supply terminal 12. The other motor terminal 19 is connected directly to one electrode 21 of the triac 20. A capacitor 26 of large capacitance is connected between the other electrode 22 of the triac 20 and the other terminal 14 of the AC supply 10.

The AC supply 10 may be 60 Hz 120 volt electrical power obtained from a conventional AC electrical outlet in a commercial or factory building or in a residence.

As has been pointed out, the triac is a semiconductor device which is capable of carrying current in two directions and is triggered into conduction by the application of a signal to its control or gate electrode when a given potential exists across its main electrodes. After being triggered into conduction, the triac remains conductive until the current through it drops below a predetermined value, approaching zero magnitude, for example near 50 milliamperes. The control signal is applied to the control electrode 24 of the triac 20 by a triggering device 28 preferably in the form of a diac, which is coupled across the circuit 15 by an RC network, generally indicated by the reference number 29. This RC network 29 includes an adjustable resistor 30 and a capacitor 32 of relatively small capacitance compared with the capacitor 26, and also a capacitor 34 of small capacitance value which is shunted across the adjustable (or variable) resistor 30. This RC network 29 along with the diac 28 form the trigger circuit for the triac 20. The variable resistor 30 serves to adjust the speed setting of the motor 16. As the resistance of this variable resistor 30 is increased, the speed of the motor is slowed down and vice-versa. The small capacitor 34 shunted across the variable resistor 30 has the function to prevent or minimize hunting at very slow motor speed settings.

The function of the triggering device or diac 28 is to initiate current flow in the triac 20. The triac 20 acts as a valve during both positive and negative half cycles of the AC supply voltage to prevent the flow of current through the motor armature during an initial portion of each half cycle of the applied voltage while permitting current flow during the latter portion of each half cycle. The point in time during each half cycle at which the triac 20 is triggered to suddenly become conductive is controlled by the RC phase-shifting circuit 29.

The sinusoidal wave form 36 of an alternating voltage from the AC source 10 is shown in FIG. 2A consisting of alternate positive and negative half waves. During each half cycle of the supply voltage 36, the voltage appearing at the connection point 37 in the RC circuit 29 is phase-shifted by an amount depending upon the manually set value of the adjustable resistor 30. This resistor is adjusted by any suitable convenient manual control member, for example such as a depressible trigger, a movable lever, a turnable knob and so forth, depending upon the particular installation or equipment in which the motor speed control 15 is being employed. The larger the resistance value setting of this resistor 30, the further that the voltage of the point 37 lags in phase behind the phase of the supply voltage 36; consequently the later in time during each cycle that the diac 28 is placed in conduction for suddenly triggering the triac into conduction and the slower the speed setting, and vice-versa.

After the triac has been triggered into conduction, there is a flow of current through the motor generally having the waveform as shown in FIG. 2B. Current flow through the motor during positive half cycles of the AC supply voltage 36 is indicated by the positive-going curves at 38, while current flow through the motor during negative half cycles of the AC supply voltage 36 is indicated by the negative-going curves at 40. As shown in FIG. 2B during a positive half cycle, when the triac is triggered into conduction, the current 38 through the motor relatively abruptly commences as shown by the vertical line segment 38-1 and then continues in an approximately sinusoidal manner during the remainder of that half cycle as indicated by the portion 38-2 of the positive-going curve 38. Similarly, during a negative half cycle, when the triac is triggered into conduction the current 40 through the motor relatively abruptly commences as shown by the vertical line segment 40-1 and then continues in an approximately sinusoidal manner during the remainder of that half cycle as indicated by the portion 40-2 of the negative-going curve 40.

The larger the area under each curve 38 and 40, the greater the amount of electrical power being supplied to the motor. Decreasing the resistance of the adjustable resistor 30 moves the curve segments 38-1 and 40-1 to the left, increasing the area under each curve 38 and 40 and thereby increasing the energization of the motor and consequently increasing its speed setting. Conversely, increasing the resistance of the resistor 30 moves the curve segments 38-1 and 40-1 to the right, decreasing the area under each curve 38 and 40 and thereby decreasing the energization of the motor and consequently decreasing its speed setting.

The advantageous manner in which this motor speed control circuit maintains the motor speed essentially constant under changes in the torque loading being applied to the motor will now be described. The conduction of the triac 20 allows current to flow through the motor 16 and through the large capacitor 26 both of which are in the same series circuit with the triac. This conduction through the motor 16 causes the capacitor 26 to become charged. Thus, voltage across the capacitor 26 occurring during each half cycle is a function of the armature current occurring during that half cycle which, in turn, is a function of the torque load being imposed upon the motor during that half cycle. In other words, the capacitor 26 senses armature current during each half cycle and develops a voltage across itself as a direct function of armature current and hence as a direct function of turque load.

Accordingly, the voltage which becomes stored on the large series capacitor 26 during each half cycle is in effect, a measurement of the torque load which was being imposed upon the motor during that half cycle. Then, this stored voltage on the capacitor 26 controls the triggering time of the triac during the next half cycle.

For example, if the torque load on the motor 16 is increased, an increased voltage will be stored on the capacitor 26 during each half cycle and accordingly the triac 20 is turned on sooner during each successive next half cycle, which in effect increases the power supplied to the motor 16. The arrows 42 in FIG. 2B show that with increasing torque load for any given speed setting the current commences sooner during each half cycle for supplying greater power to the motor for resisting the tendency of the motor to slow down as the torque load is increased, and conversely when the torque load is decreased for any given speed setting. This is a positive feedback action which delivers a varying current to the load in accordance with the loading on the motor for resisting the tendency of the motor to slow down under increased torque load and also for resisting the tendency of the motor to speed up under decreased torque load. Therefore, the motor speed is maintained substantially constant in spite of changes in torque loading for any given speed setting (over a wide operating range of speed settings), until the current through the motor reaches the maximum possible amount for the given circuit setting.

When the speed setting is at approximately one-third full speed or above, this circuit will increase the current through the motor up to full rated motor current as the torque load is increased.

When the speed setting is so low as to be below approximately one-third of full speed, this circuit will drammatically increase the current through the motor as the torque load is increased, but full rated motor current is not obtained when the speed setting is at such a low value.

In summary, as seen in FIG. 2B, the effect of increasing torque load on the firing angle of the positive half cycle current flow 38 and negative half cycle current flow 40 is shown by the arrows 42 indicating that with increasing load, the triac is turned on sooner supplying more current to the motor 16 to maintain a substantially contant speed under a variable load for any given setting of the adjustable resistor 30 over a wide operating range of torque loading, and vice-versa.

In this manner, the motor speed control circuit 15 advantageously provides feedback action because the motor current is effectively being samples during each half cycle. The results of this sampling then controls the firing angle of the triac during the next half cycle for increasing the current being supplied to the motor as the torque load is increased, and vice-versa as the torque load is decreased.

By using an asymmetric diac 28, for example, GE ST4 any hysteresis effect in the switching action of the diac will be minimized. If desired a low voltage disc-like device for example an MBS 4991 may be used for the component 28. The presently preferred component is the GE ST4. As used in the claims the term "diac-like device" is intended to be interpreted sufficiently broadly to include a diac, an asymmetrical diac or a device such as the MBS 4991.

The use of the trimmer capacitor 34 across the variable resistor 34 acts as a phase shifter at very low speed setting, which tends to reduce gain, thereby somewhat reducing the positive feedback action at very low speed settings. Limiting the sensitivity in this area prevents hunting and allows the motor control circuit 15 to operate smoothly over a large speed control range. The trimmer capacitor 34 has a relatively small capacitance value of approximately 1,200 to 2,000 picofarads (pf). This trimmer capacitor 34 may be an adjustable capacitor and may be adjusted to the value which serves most effectively for minimizing hunting at the very low end of the range of speed settings under no load conditions for the particular universal motor whose speed is being controlled.

The capacitor 26 has a relatively very large capacitance, for example, being a 10 volt, non-polar capacitor in the range of 500 to 1,000 microFarads (mf) per Ampere of peak load current. The particular size, of course, will depend upon the motor type and size and its operating characteristics along with the particular application to which the circuit is to be employed.

EXAMPLE I

In this example, the universal motor 16 draws approximately three Amperes when running at normal operating speed at full rated load. The adjustable resistor 30 has a range from 0 to 100,000 ohms. The capacitor 26 is a non-polar capacitor having a rating of 10 volts (RMS) and a capacitance in the range from 1,500 to 3,000 mf, for example being 2,500 mf in this example involving a 3 Ampere rated universal motor. The trimmer capacitor 34 is adjustable and is approximately 2,000 pf. The phase-shift capacitor 32 has a capacitance of approximately 0.1 microFarads. The triac 20 may be any commercially available triac capable of carrying the maximum current that will flow through the motor. This maximum current flow can occur when the user turns on the switch 18 with the speed setting at its maximum value and with the motor so heavily overloaded that the motor is stalled. In such a case the current flow may be 5 to 7 Amperes, as compared with the usual peak current flow of 2 to 3 Amperes when running at full load at a speed setting above approximately one-third of full speed. An example of a suitable triac is the 2N6347A obtainable from General Electric and Motorola. The component 28 is a diac-like device having the characteristics described above, preferably being an asymmetric diac.

The circuit disclosed and described is simple, efficient and provides a stable speed control over a wide operating range. The circuit automatically senses and adjusts the application of power to the motor when it is subjected to varying loads during each half cycle of the applied potential for maintaining a relatively constant speed in face of such varying loads.

Although the foregoing illustration sets forth an AC supply source of, for example, 60 Hz 120 volts, it is to be understood that the present invention can be embodied in a motor speed control circuit for use with any AC supply source, for example such as 50 Hz 240 volts, or any other frequency and voltage, as the case may be.

Inviting attention to FIG. 3, it is seen that this illustrative embodiment of the energy-saving induction motor control circuit 50 is identical in arrangement to the motor speed control circuit 15 of FIG. 1. Those components in FIG. 3 which are similar to those in FIG. 1 have the same reference numbers. Instead of the universal motor 16 in FIG. 1, there is an induction motor 52 having a rotor 53, and one or more running windings 54. This motor may include a starting winding 56 in series with a starting capacitor 58 and a starting switch 59.

During operation, under no load or light loading conditions, the control 50 automatically reduces the effective voltage being applied to the motor 52, thereby dramatically reducing the reactive component of current flowing in the motor and consequently significantly reducing the $I^2R$ losses. This very advantageous control action occurs because the magnitude of the real component of the current flowing through the induction motor 52 and through the large series capacitor 26 is essentially a direct function of the load on the induction motor. Therefore, as the load on the motor decreases, the firing angle of the triac 20 automatically decreases for decreasing the effective voltage being applied to the motor 52 and conversely as the load on the motor increases.

This decrease in the applied induction motor voltage serves to decrease the reactive current under no load and light loading conditions. Consequently, there is obtained a very significant saving in energy consumption by using the energy-saver circuit in FIG. 3 as compared to the energy consumption which would otherwise occur due to the usual larger $I^2R$ losses resulting from relatively large reactive current flow under no load and low loading conditions of an induction motor.

EXAMPLE II

The energy-saver circuit 50 was tested with an induction motor 52 of the type used in a food processor and an AC line voltage 10 of 120 volts (RMS). The components of the circuit 50 had the same values as set forth above in the universal motor speed control Example I. Under no load conditions this motor normally consumes 150 watts and runs at a speed of 1,790 RPM. I adjusted the control resistor 30 to a setting which reduced the effective voltage "V" across the motor, to a value in the range of 52 to 50 volts (RMS) with the motor still running under no load. This value of V is somewhat less than one-half of the rated voltage for this induction motor. The speed decreased only slightly to 1,770 RMP, but the energy consumption was dramatically decreased to 36 watts, being only 24% of the normal no load energy consumption.

The control resistor 30 was left in this same position, and the induction motor 52 was then fully loaded until it stalled. The applied voltage V across the motor increased to 118 volts, being within 2 volts of the line voltage.

Therefore, under full load conditions the motor 52 operated essentially normally, as though the control circuit 50 were not present, but under no load or light loading there is this dramatic decrease in energy consumption, which is obtained by this energy-saver circuit.

My theory for explaining this reduction in energy consumption will now be explained. Regardless of whether this theory is correct, the reduction in energy consumption is true as measured by conventional AC meters. My theory is that the "real" part of the line current (i.e. that part of the current which is in phase with the line voltage) is essentially a direct function of the load on the motor. In the normal situation, when the motor is under no load and light loading, the real part of the current is low, but the reactive part of the current is large, causing a relatively large consumption of power due to $I^2R$ losses in the induction motor. This control 50 automatically reduces the RMS voltage V applied across the motor to approximately one-half of the line voltage. The reactive current is reduced to approximately one-half, and therefore the total $I^2R$ losses (the major portion of which are caused by reactive current under low load conditions) are thereby reduced approximately to one-fourth (actually reduced to 24% in this example).

As the load on the motor is increased, the real part of the line current is correspondingly increased. Consequently, the voltage appearing across the capacitor 26 in series with the induction motor will serve to advance the firing angle of the triac as the load on the motor increases.

Another way of explaining this dramatic energy saving under low and no load conditions is that the power consumption in the motor is a direct function of $V^2/R$. Since the applied voltage V was reduced to approximately 60 volts (RMS) ($\frac{1}{2}$ line voltage) under no load, the $V^2/R$ loss was reduced to approximately 25% of its conventional value.

EXAMPLE III

In another test of the control circuit 50 the induction motor 52 was the induction motor of an IBM typewriter. The normal power consumption of this typewriter is typically 40 watts. Since the duty cycle of the motor is so low, even with the fastest typist, the IBM motor is essentially almost always operating under no load conditions. This control reduced the power consumption from 40 watts to 20 watts.

The control 50 which was used in this typewriter motor example had component values as set forth in Example II designed for a larger induction motor. It is my opinion that when I have constructed a control having a smaller capacitor in series with the typewriter motor, it will reduce the no load or low load power from 40 watts to approximately 10 watts.

The implications of this invention are tremendous. For example, there are approximately one million IBM electric typewriters. A reduction from 40 watts to 10 watts is a power saving of thirty million watts; in other words, 30 megawatts. Furthermore, in the summertime the use of such typewriters produces a heating effect in office buildings, requiring additional power for air conditioning. Therefore, there will be a considerable savings in office air conditioning energy consumption as well.

Moreover, this reduction in power consumption in the motors will enable the typewriter motor to be constructed with less materials and probably without the necessity of a cooling fan, thereby again providing further savings in materials and energy.

EXAMPLE IV

Another example in which the energy-saver circuit of FIG. 3 may be used to great advantage is the ordinary home refrigerator which usually has an induction motor driven compressor. There is usually a temperature sensor in the refrigerated space which causes the induction motor to start driving the compressor whenever the temperature in the refrigerated space has reached a pre-set temperature level. When the compressor starts being driven, the pressure of the refrigerant gas is usually low, because this is the beginning of a refrigeration cycle of operation. Consequently, the load on the induction motor is low. Therefore, the energy-saver circuit of FIG. 3 reduces the RMS voltage "V" across the induction motor to a value of approximately one-half of its rated value, namely a value sufficient for the motor to drive the lightly loaded compressor. Consequently, the reactive current is reduced with a consequent significant reduction in energy consumption under such light loading conditions.

As the compressor continues to be driven during a refrigeration cycle of operation, the pressure of the compressed gas increases, thereby producing an increased loading on the induction motor, and the energy-saver circuit 50 correspondingly increases the voltage V (RMS) across the induction motor. When the full pressure is reached, the compressor motor shuts off.

Therefore, it will be understood that there is a considerable saving in electrical energy obtained during the initial portion of each refrigeration cycle of operation, when the induction motor is running relatively lightly loaded.

Again, it is seen that the implications of this energy-saver invention are tremendous, because home refrigerators are in use twenty-four hours per day for 365 days per year.

The energy-saver circuit 50 can be used to advantage with any single-phase induction motor having a normal full load current value of no more than approximately 8 to 12 Ampere (RMS) when running at normal operating speed and having no load or low loading occurring during significant portions of its duty cycle.

Since other changes and modifications varied to fit particular operating requirements and environments will be understood to those skilled in the art, the invention is not considered limited to the examples chosen for purposes of illustration, and covers all changes and modifications which do not constitute a departure from the true spirit and scope of this invention.

What is claimed is:

1. A motor speed control circuit for supplying electrical power to a motor during both positive and negative half cycles of an alternating current supply voltage in which power is automatically varied as the load on the motor varies at any given speed setting in order to maintain the motor speed substantially constant at that speed setting under variable load conditions, said motor speed control circuit comprising:

a pair of terminals adapted for connection to an electric motor of the universal type having an armature winding and a commutator, a triac having first and second electrodes and a control electrode, a pair of alternating current (AC) supply terminals, a capacitor of relatively large capacitance value of the non-polar type having a capacitance in the range of 500 to 1,000 microFarads per ampere of peak motor current when the motor is operating under full rated load at full speed setting, said pair of supply terminals, said motor terminals, said first and second electrodes of said triac and said capacitor being connected in a series circuit, a phase-shifting trigger circuit having a speed-control variable resistor, said trigger circuit being connected across said series circuit, with said trigger circuit being connected to said control electrode of said triac for adjusting the desired speed of the motor by adjusting said variable resistor for adjusting the firing angle of said triac, by virtue of said capacitor being in said series circuit with the motor and the triac, the charging voltage occurring on the capacitor during each half cycle of the AC supply voltage is a function of the current flowing through the armature winding which in turn is a function of the torque load being imposed on the motor at that moment, whereby the magnitude of said charging voltage occurring on said capacitor during each half cycle automatically changes the firing angle of the triac at a given setting of said variable resistor during each succeeding half cycle for increasing the power to the motor when the torque load has increased and for decreasing the power to the motor when the torque load has decreased, thereby to maintain the motor speed substantially constant at any given speed setting of said variable resistor over a relatively wide range of torque loading on the motor.

2. The motor speed control circuit set forth in claim 1, in which:

said trigger circuit includes a phase-shift capacitor forming an RC network with said variable resistor and a diac-like device serially coupled between the junction of said phase-shift capacitor and said variable resistor in said RC circuit and said control electrode of said triac.

3. The motor speed control circuit set forth in claim 2, in which:

said diac-like device is an asymmetrical diac.

4. The motor speed control circuit set forth in claims 2 or 3, in which:

a trimmer capacitor is connected across said variable resistor for minimizing "hunting" of the motor under no load conditions at motor speed settings.

5. A motor speed control circuit for a motor of the type having an armature winding for supplying electric power to the motor during both positive and negative half cycles of an alternating current supply voltage in which the power being supplied to the motor is automatically varied as the load on the motor varies at any given speed setting in order to maintain the motor speed substantially constant at that speed setting under variable torque load conditions, said motor speed control circuit comprising:

a pair of motor terminals for connection to the motor whose speed is to be controlled, a triac having first and second electrodes and a control electrode, a pair of alternating current (AC) supply terminals for connection to an AC supply source of single phase, a capacitor of relatively large capacitance value of the non-polar type, the capacitance of said capacitor being in excess of 500 microFarads per ampere of maximum motor current (RMS) when the motor is operating under full rated load and running at normal full speed, said pair of supply terminals, said motor terminals, and said first and second electrodes of said triac and said capacitor being connected in a series circuit, a phase-shifting circuit having a junction point therein, said phase-shifting circuit including an adjustable resistor connected in circuit between said junction point and a point in said series circuit intermediate said motor and said triac, said adjustable resistor serving the function of adjusting the desired speed setting of the motor, said phase-shifting circuit also including a second capacitor connected in circuit between said junction point and a point in said series circuit on the opposite side of said first capacitor from said triac, and a diac-like device connected from said junction point to said control electrode, by virtue of all of which the charging voltage occurring on the capacitor during each half cycle of the supply voltage is a function of the torque load being imposed on the motor at that moment and automatically controls the firing instant of the triac during each succeeding half cycle at any given setting of said variable resistor for increasing power being supplied to the motor under conditions of increased torque load and for decreasing power being supplied to the motor under conditions of decreased torque load for maintaining said motor speed substantially constant at any given speed setting of said variable resistor in spite of variations in torque loading.

6. The motor speed control circuit set forth in claim 5, in which:

a third capacitor, being a trimmer capacitor, is connected across said adjustable resistor for minimizing "hunting" of the motor under no load conditions at very slow speed settings of said adjustable resistor.

7. A motor speed control circuit for a motor of the type having an armature winding for supplying electric power to the motor during both positive and negative half cycles of an alternating current supply voltage in which the power being supplied to the motor is automatically varied as the load on the motor varies at any given speed setting over a range in settings from full speed down at least to one-third of full speed in order to maintain the motor speed substantially constant at that speed setting under variable torque load conditions, said motor speed control circuit comprising:

a pair of motor terminals for connection to the motor whose speed is to be controlled, a pair of alternating current (AC) supply terminals for connection to an AC supply source, bi-directional conduction means having first and second terminals and a trigger terminal, said bi-directional conduction means normally being non-conductive until fired into conduction by said trigger terminal when there exists a significant differential in applied voltage between said terminals, a capacitor of relatively large capacitance value of the non-polar type, circuit means connecting said pair of motor terminals in series with said capacitor, with said first and second terminals of said bi-directional conduction means and with said supply terminals, and control means connected to said trigger terminal for setting the instant in time during each half cycle of the AC supply voltage that said bi-directional conduction means is fired into conduction for setting the desired motor speed in said range, by virtue of all of which the charging voltage occurring on said series capacitor during each half cycle of the supply voltage is a function of the torque load being imposed on the motor at that moment and automatically changes the instant during each succeeding half cycle when said bi-directional conduction means is fired into conduction for increasing power being supplied to the motor under conditions of increased torque load and for decreasing power being supplied to the motor under conditions of decreased torque load for maintaining said motor speed substantially constant at the given speed setting in spite of variations in torque loading.

8. The motor speed control circuit as claimed in claim 7, in which:

said bi-directional conduction means is a triac located in said series circuit between one of the motor terminals and the series capacitor.

9. The motor speed control circuit as claimed in claim 8, in which:

said control means is a phase-shifting circuit connected between said one motor terminal and the opposite side of the series capacitor from that which is connected to said triac, and said phase-shifting circuit is connected to said trigger terminal through a diac-like device.

10. An energy-saver circuit for use with an induction motor in an installation in which the duty cycle of the induction motor includes significant time periods of no load and/or low loading operation, comprising:

a pair of motor terminals for connection to the induction motor, a pair of supply terminals for connection to a source of alternating current (AC), a capacitor of the non-polar type having a relatively large capacitance value at least equal to 500 microFarads times the numerical value of the normal RMS current through the induction motor when said motor is running at rated full speed and at rated full load, bi-directional conduction means having first and second terminals and a trigger terminal, said bi-directional conduction means normally being non-conductive until fired into conduction by said trigger terminal, circuit means connecting said pair of motor terminals in series with said capacitor, with said first and second terminals of said bi-directional means and with said supply terminals, control means connected to said trigger terminal for setting the instant during each half cycle of the AC supply voltage that said bi-directional conduction means is fired into conduction for decreasing the RMS value of the voltage across said motor terminals of said induction motor when running at no load to a reduced value compared with the normal rated voltage of said induction motor, said decreased RMS motor terminal voltage at no load being a value at which the no load motor speed is only very slightly reduced, such value usually being approximately one-half of rated motor voltage, and said control means being responsive to the voltage across said series capacitor, whereby by virtue of said capacitor being in series with said induction motor, the charging voltage occurring on the series capacitor increases when the torque load on the induction motor increases and decreases when the torque load on the induction motor decreases, thereby automatically advancing the firing instant of said bi-directional conduction means during each succeeding half cycle when there is an increase in torque load for increasing the RMS value of the motor terminal voltage, and thereby automatically retarding the firing instant during each succeeding half cycle when there is a decrease in torque load for decreasing the RMS value of the motor terminal voltage, as a consequence of all of which there is a significant decrease in energy consumption by the induction motor during no load and/or light loading operation and yet the motor automatically runs at approximately full rated terminal voltage and approximately full normal speed when being subjected to full normal torque loading.

11. The energy-saver circuit for an induction motor as claimed in claim 10, in which:

said bi-directional conduction means is a triac connected in series between one of the motor terminals and one side of said series capacitor.

12. The energy-saver circuit for an induction motor as claimed in claim 10 or 11, in which:

said control means is a phase-shifting network including an adjustable electrical component, said phase-shifting network being connected in shunt relationship across both said bi-directional conduction means and said series capacitor.

* * * * *